US011377560B2

(12) United States Patent
Webb et al.

(10) Patent No.: US 11,377,560 B2
(45) Date of Patent: Jul. 5, 2022

(54) MODIFIED ASPHALTS AND METHODS FOR PRODUCING THE SAME

(71) Applicant: ExxonMobil Technology and Engineering Company, Annandale, NJ (US)

(72) Inventors: Jonathan D. Webb, Bridgewater, NJ (US); Nadjib Boussad, Bois-Guillaume (FR); Katherine L. Sokol, Sarnia (CA); Patrick Brant, Seabrook, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 306 days.

(21) Appl. No.: 16/694,273

(22) Filed: Nov. 25, 2019

(65) Prior Publication Data
US 2020/0190327 A1 Jun. 18, 2020

Related U.S. Application Data

(60) Provisional application No. 62/781,292, filed on Dec. 18, 2018.

(51) Int. Cl.
*C08L 95/00* (2006.01)
*C08J 3/00* (2006.01)

(52) U.S. Cl.
CPC .............. *C08L 95/00* (2013.01); *C08J 3/005* (2013.01); *C08J 2395/00* (2013.01); *C08J 2423/16* (2013.01)

(58) Field of Classification Search
CPC .................................. C08L 95/00; C08J 3/00
USPC ......................................................... 524/70
See application file for complete search history.

(56) References Cited

U.S. PATENT DOCUMENTS

| | | | |
|---|---|---|---|
| 3,575,932 | A | 4/1971 | Hedge et al. |
| 4,154,710 | A | 5/1979 | Maldonado et al. |
| 5,070,123 | A | 12/1991 | Moran |
| 6,117,962 | A | 9/2000 | Weng et al. |
| 6,147,180 | A | 11/2000 | Markel et al. |
| 6,444,773 | B1 | 9/2002 | Markel |
| 7,279,536 | B2 | 10/2007 | Brant et al. |
| 8,093,336 | B2 | 1/2012 | Jacob et al. |
| 8,283,428 | B2 | 10/2012 | Brant et al. |
| 8,372,930 | B2 | 2/2013 | Brant et al. |
| 2008/0251418 | A1 | 10/2008 | Francisco et al. |
| 2014/0051808 | A1 | 2/2014 | Tse |
| 2014/0135431 | A1* | 5/2014 | Moran .................. C08K 5/10 524/69 |

FOREIGN PATENT DOCUMENTS

| | | |
|---|---|---|
| CA | 2428995 A1 | 11/2004 |
| CN | 101629021 B | 11/2012 |
| CN | 102181299 B | 4/2013 |
| KR | 19990079717 A | 11/1999 |
| KR | 100764917 B1 | 10/2007 |

OTHER PUBLICATIONS

Escobar et al., "The use of octylated asphaltenes in the determination of the size, shape and dispersion properties of asphaltenes", Proceedings of the First International Symposium on Colloid Chemisty in Oil Production, Rio de Janeiro, 1995, pp. 242-247.
Baltisberger et al., Use of Acetylation and Carbon—14 Counting to Quantitate Hydroxyl Groups in Preasphaltenes and Asphaltenes from Coal Hydrogenation, 177th ACS Natl. Meet. Honolulu Apr. 1979) (ADAPT.) Fuel, vol. 61, N.9, pp. 848-852 (Sep. 1982), Univ. N.D.).
Desbene et al., "The transalkylation reaction: Analytical tool for the study of heavy crude oil fractions. Application to asphaltenes of various types", Adv. Org. Geochemistry, 16, 1990, pp. 969-980.
Filley et al., "Reactions of 13-C-labeled 4-methyldibenzothiophene carbonized with FCC decant oils", Energy & Fuels, 11, 1997, pp. 631-636.
Acevedo et al., "Synthesis and isolation of octylated asphaltene standards for calibration of g.p.c. columns and determination of asphaltene molecular weights", Fuel, 71, 1992, pp. 1077-1079.
Acevedo et al., "Study of the molecular structure of asphaltenes from the Orinoco Petroliferous Belt", Act Cientifica Venezolana, 33, 1982, pp. 440-444.
Cagniant et al., "Structural modifications of petroleum asphaltenes by reductive alkylation investigated by TLC-FID", Fuel, 80, 2007, pp. 107-115.
Pokonova, "Resins and asphaltenes—modifiers for epoxy resin", Chemistry and Technology of Fuels and Oils, 43, 2007, pp. 135-139.
Tiaoyi et al., "Cross-linking FCC Slurry and Vacuum Residue Produce Road Asphalt", Guangdong Huagong, 39, 2012, pp. 274-275.
Mochida et al., "Modifying carbonization properties of pitches (part 4)—Reactions of alkylation, hydrogenation and acylation for Kureha-pitch", J. Fuel Soc. Japan, 54, 1975, pp. 994-1001.
Mochida et al., "Modifying carbonization properties of pitches (part 5)—Conversion of quinoline insoluble in the petroleum pitch by means of alkylation and acylation", J. Japan Petrol. Inst., 21, 1978, pp. 16-21.
"Modification improves asphalt properties", Chem. Eng. News, 56, 1978, pp. 24-25.
Rakotondradany et al., "Hexabenzocoronene Model Compounds for Asphaltene Fractions: Synthesis & Characterization", Energy & Fuels, 20, 2006, pp. 2439-2447.
Quirke, "Friedel-Crafts acylation of petroporphyrins: a valuable method for structural elucidation and correlation studies", Adv. Org. Geochem. Proc. 10th Int. Meet., 1983, pp. 733-737.

(Continued)

*Primary Examiner* — Deve V Hall
(74) *Attorney, Agent, or Firm* — Robert A. Migliorini

(57) ABSTRACT

Modified asphalts and methods for producing the same are disclosed. The modified asphalts can include asphalt having a T5 boiling point of 400° C. or more, an olefin compound, and an acid promoter. The modified asphalt can include at least a portion of the olefin compound chemically grafted to at least a portion of the asphalt. The method can include exposing the asphalt, olefin compound, and acid promoter to a temperature of about 160° C. or more.

23 Claims, 3 Drawing Sheets

(56) References Cited

OTHER PUBLICATIONS

Juyal et al., "Effect on molecular interactions of chemical alteration of petroleum asphaltenes", Energy & Fuels, 19, 2005, pp. 1271-1281.
Speight, "Chemical reacations of petroleum asphaltenes", Need Better English Abstract.
Epinat, "Chemical modifications of bitumens mixed with polyfunctional organic compounds", Bulletin de Liaison des Laboratoires des Ponts et Chaussees, 1977, pp. 109-118.
Desando, "Chemical derivitization of Athabasca oil sand asphaltene for analysis of hydroxyl and carboxyl groups via nuclear magnetic resonance spectroscopy", Fuel, 81, 2002, pp. 1305-1319.
Zielinski et al., "Benzo[a]pyrene in Coal Tar Pitch: Chemical conversion in situ by alkylation", Fuel, 75, 1996, pp. 1543-1548.
Wachowska et al., "Applicaton of non-reductive alkylation in liquid ammonia to studies on macromolecular structure of coals and bitumen-derived asphaltene", Fuel, 65, 1986, pp. 1081-1084.
Desbene et al., "Analytical study of heavy crude oil fractions by coupling of the transalkylation reaction with supercritical fluid chromatography", Journal of Chromatography, 593, 1992, pp. 321-327.
Rietjens et al., "An analysis of crude oil-acid reaction products by size-exclusion chromatography", Fuel, 80, 2001, pp. 33-40.
Illman et al., "Alkylation of asphaltenes", ASTM Special Technical Publication, vol. Date 1963, 1964, pp. 21-38.
Siddiqui, "Alkylation and oxidation reactions of Arabian asphaltenes", Fuel, 82, 2003, pp. 1323-1329.
Kukharev et al., "1-alkyl-1,1-dimethylhydrazinium chlorides as modifiers of oil asphalts for road building applications", Russian Journal of Applied Chemistry, 79, 2006, pp. 683-684.
Zhu et al., "Polymer modification of bitumen: advances and challenges", European Polymer Journal, 54, 2014, pp. 18-38.
Sternberg et al., "On the Solubilization of Coal via Reductive Alkalytion", pp. 87-94.
The International Search Report and Written Opinion of PCT/US2019/063010 dated Feb. 25, 2020.
"Section 916 Bituminous Materials", AASTHO M320-10, Table 1, Aug. 31, 2012, pp. 1-11.
"Asphalt—Wikipedia", URL:https://en.wikipedia.org/wiki/Asphalt [retrieved on Feb. 3, 2020] "Production".
Jiqing Zhu: "StorageStability and Phase Separation Behaviour of Polymer-Modified Bitumen : Characterization and Modelling", Sep. 1, 2016, pp. 1-81.
Bernard Boutevin et al: "Bitumen-Polymer Blends for Coatings Applied to Roads and Public Constructions", Progress in Organic Coatings Montpellier Cddex, Jan. 1, 1989, p. 239.
Giovanni Polacco et al.,"A review of the fundamentals of polymer-modified asphalts: Asphalt/polymer interactions and principles of compatibility", Advances in Colloid and Interface Science, vol. 224, Oct. 1, 2015, pp. 72-112.
Carlo Giavarini et al.,"Production of stable polypropylene-mod ified bitumens", Fuel,vol. 75, No. 6, pp. 681-686, May 1, 1996.

* cited by examiner

MODIFIED ASPHALTS AND METHODS FOR PRODUCING THE SAME

CROSS-REFERENCE TO RELATED APPLICATIONS

This application claims priority to U.S. Provisional Application Ser. No. 62/781,292 filed Dec. 18, 2018, which is herein incorporated by reference in its entirety.

FIELD

Modified asphalts and methods for producing the same are provided.

BACKGROUND

Asphalt, a material derived from the distillation residue of crude petroleum, can be utilized as a binder for stone aggregate in pavement construction. In certain conventional systems, the asphalt may be blended with various components, such as one or more polymers, to produce an asphalt binder for use in pavement construction that has a reduced tendency to creep and rut in warmer weather and/or can minimize cracking of the pavement in colder weather. Certain conventional high performance asphalt binders are known that may be suited for road surfaces with high load, stress, and deformation such as highways, bridges, and runways. However, the production of such conventional high performance asphalt binders can be resource intensive and may require complex formulations and/or manufacturing processes. It would be desirable to produce modified asphalts, e.g., high performance asphalt binders, in a less resource intensive manner and/or with a reduced manufacturing or formulation complexity that exhibit suitable storage stability.

Chinese Patent No. 102181299 describes the conversion of petroleum pitch to mesophase pitch at increased temperature and pressure. The conversion utilizes small $C_2$-$C_4$ olefins including ethylene, propylene, and 1-butene, and a Friedel-Crafts catalyst including HF, sulfuric acid, and boron trifluoride. The conversion is performed at elevated pressure which requires complex engineering in a manufacturing facility.

PCT Application Publication No. WO1999/002776 describes bitumen-polymer compositions that include the use of styrene-butadiene-styrene (SBS) and a sulfur coupling agent. The sulfur coupling agent can cross-link the butadiene backbone of SBS to create cross-linked SBS in the composition. However, the formation of these bitumen-polymer compositions with the cross-linked SBS requires an elevation in the paving temperature and results in increased $H_2S$ emissions.

U.S. Pat. No. 6,743,838 describes polyepoxy-polymer-linked asphalt having enhanced properties. The polyepoxy-polymer-linked asphalt is made by reacting a glycidyl-functionalized ethylene copolymer with reactive asphalt. However, the method of manufacturing this polyepoxy-polymer-linked asphalt is rather complex, as the polyepoxy-polymer-linked asphalt has a propensity to gel if the cross-linking/grafting reaction is not controlled.

SUMMARY

In one aspect, a method for modifying an asphalt is provided. The method can include exposing an asphalt having a T5 boiling point of 400° C. or more to: 1) 0.2 wt. % to 5 wt. % of an olefin compound having a molecular weight of 0.2 kDa to 110 kDa; and 2) 0.1 wt. % to 2 wt. % of an acid promoter to form a modified asphalt.

In another aspect, an asphalt composition is provided. The asphalt composition can include an asphalt having an initial or T5 boiling point of 400° C. or more; 0.2 wt. % to 5 wt. % of an olefin compound having a molecular weight between 50 kDa and 110 kDa; and 0.1 wt. % to 2 wt. % of an acid promoter selected from $AlCl_3$, $H_2SO_4$, polyphosphoric acid, $BCl_3$, $ZnCl_2$, $SnCl_4$, $TiCl_4$, zeolites, or a combination thereof. The asphalt composition can be formed at a temperature of 160° C. to 230° C. Additionally, the asphalt composition can have a high temperature performance grade of 58° C. or more and a low temperature performance grade of −34° C. to −16° C.

DETAILED DESCRIPTION

Overview

Figure 1:
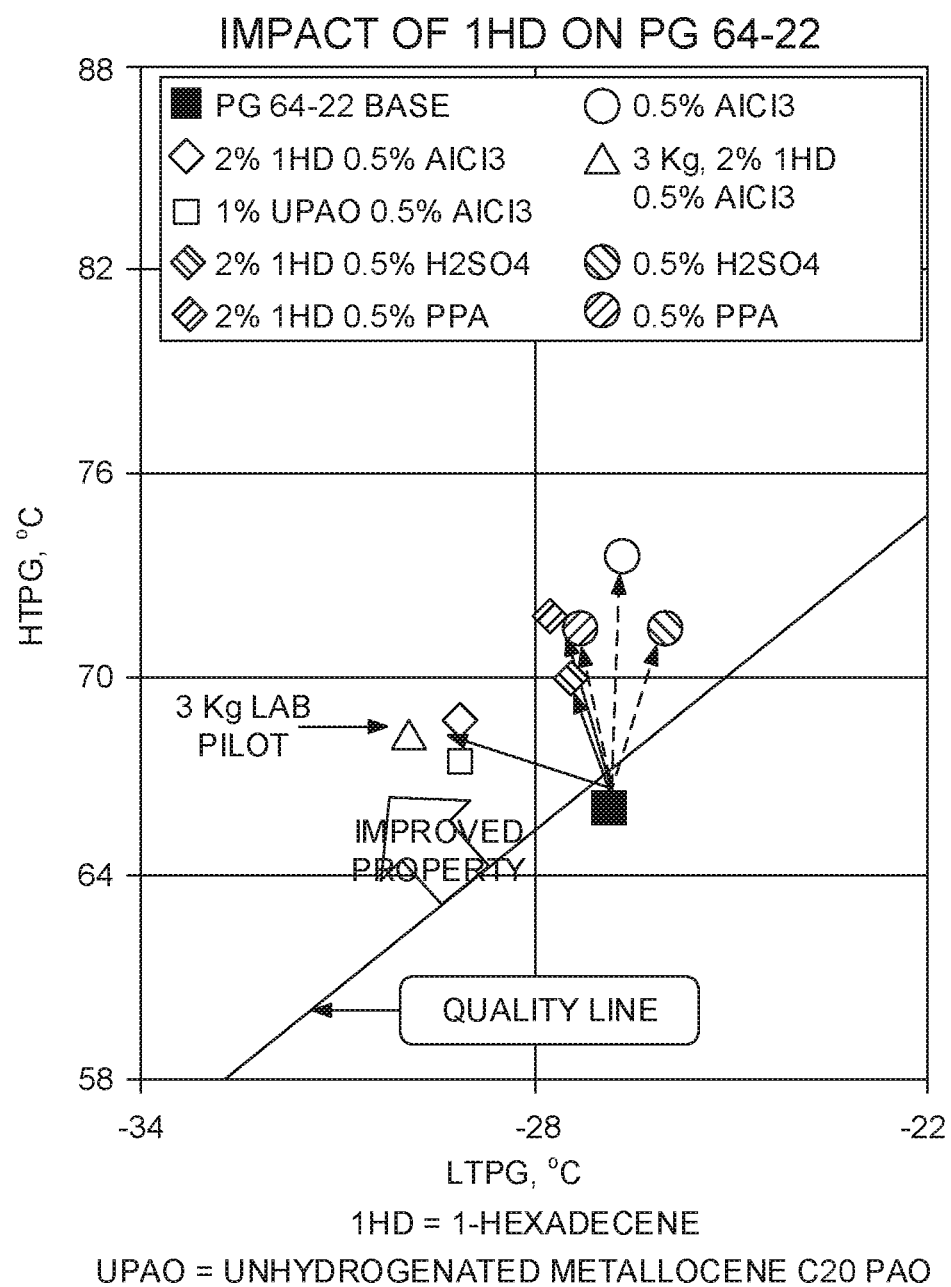
FIG. 1 depicts a SUPERPAVE™ matrix grid showing the performance grade of various modified asphalts.

In various aspects, modified asphalts and methods for producing the same are provided. In aspects, the modified asphalts can include an asphalt that has been modified by the chemical grafting of an olefin compound facilitated by an acid promoter.

Asphalt is a viscoelastic semi-solid bituminous material derived from the distillation residue of crude petroleum. Asphalt may be obtained from a variety of sources including straight run vacuum residue, mixtures of vacuum residue with diluents such as vacuum tower wash oil, paraffin distillate, aromatic and naphthenic oils and mixtures thereof, oxidized vacuum residues or oxidized mixtures of vacuum residues and diluent oils and the like. Other asphalt materials may include coal tar pitch, rock asphalt and naturally occurring asphalt.

Because asphalt is hydrophobic and has good adhesive and weathering characteristics, it may be used as a binder or cement for stone or rock aggregate in pavement construction (conventionally about 5 weight % of the mixture). If, because of the nature of the crude oil distilled, the asphalt is too soft at ambient temperature, a harder product may be manufactured, for example, by increasing the vacuum distillation tower temperature, by extraction of the lighter components with liquid propane or other solvents, or by oxidizing by air blowing at an elevated temperature. However, in most cases, these manufacturing processes can produce asphalts that are too brittle at low temperature, and result in excessive cracking in cold weather. As discussed above, another way of stiffening soft asphalt with less detrimental impact on its low temperature properties and so as to extend its useful temperature range is by blending with suitable polymers. Polymers can reduce the tendency of an asphalt pavement to creep and rut in warm weather by increasing its high temperature viscoelastic stiffness and at the same time permit the use of softer grades of asphalt to minimize cracking in cold weather. Thus, conventionally, polymers have been blended with asphalt which permit the use of, in some instances, softer grades of asphalt to reduce cracking in cold weather without risking excessive softening leading to undesirable deformation/rutting in hot, summer weather. Unfortunately, many of such asphalt-polymer blends are not storage stable.

For example, a polymer such as polyethylene has been added to asphalt to produce asphalts which exhibit an increased resistance to creep or deformation. In addition, polyethylene modified asphalts should also have good compatibility between the asphalt and polyethylene, and be stable at high temperatures during storage and asphalt plant operation for ease of handling and application. Compatibility between the polyethylene and asphalt is important to ensure that the engineering properties of both the asphalt and polyethylene are transferred to the finished product and to provide good long term performance. However, most polyethylene modified asphalts require either continuous mixing or the addition of various additives to avoid phase incompatibility which require continuous high shear mixing to obtain physical dispersion of a polyolefin in bitumen, and/or the addition of one or more dispersants to a polyethylene modified asphalt to avoid phase separation.

The addition of block copolymer such as styrene-butadiene-styrene (SBS) has been used to modify asphalt for additional applications, such as roofing sheets, adhesives and coatings. In certain systems, such a modified asphalt may exhibit a higher elasticity and greater range of plasticity than straight-run asphalts. In certain other systems, SBS-modified asphalts have resulted in improved adhesiveness, strength and deformation resistance, and can be useful as a pavement structure for roadways which experience heavy repetitive loads.

In various systems, asphalt can be made by distillation under vacuum to a cut temperature yielding, typically, a resid with particular penetration at 25° C. and viscosity at 100° C. Once it meets the specific penetration and viscosity ranges the asphalt may be routed to a rundown tank where it can be held for certification testing against all specifications. Once it meets the specifications the tank of asphalt can be certified and sealed until shipped to the customer with no new asphalt production added. Prior to delivery such asphalt can be stored in the refinery at industry typical temperatures depending on the hardness or stiffness of the asphalt. Reference is made to a best practices publication issued by the Asphalt Paving Environmental Council comprising The Asphalt Institute, the National Asphalt Paving Association and the State Asphalt Pavement Associations entitled "Best Management Practices to Minimize Emissions During HMA Construction", EC 101 04/00. This publication contains a table insert of "Typical Asphalt Binder Temperatures". The highest stiffness, lowest penetration asphalt listed, designated as PG 82-22 has a recommended hot mix asphalt (HMA) plant asphalt storage tank temperature range of 157 to 168° C. and a recommended HMA plant mixing temperature of 143 to 171° C. when mixing the fluid asphalt with the aggregate to adequately cover all of the aggregate surface area. In order to accommodate this industry practice the asphalt manufacturer strives to deliver to the HMA plant at an industry accepted 176° C. maximum. This requires that the asphalt manufacturer heat the asphalt at the lowest possible temperature to guarantee delivery to these temperature limits. This practice of minimizing emissions translates to mixing and blending vacuum resid asphalt and enhanced asphalts to the lowest, feasible temperature ranges. In addition to generating emissions, storage of asphalt at higher temperatures can lead to product hardening during storage and difficult handling and unloading at the HMA plant. Therefore, industry practice is to store asphalt and asphalt based products at the lowest, feasible temperature as soon as possible following manufacture.

It is not always practical to keep an asphalt-polymer blend continuously homogenized before mixing the blend with aggregates: consequently, storage stability is desirable to keep the blend from separating under storage conditions. Various methods have been suggested for making polymer modified asphaltic compositions that are sufficiently storage stable and that also have the visco-elastic properties in the ranges required for a particular application. In most of cases, this results in products for which the softening point property is strongly affected by the nature of the virgin asphalt.

Various components have been added to asphalts and polymer modified asphalts to improve their physical properties such as storage stability and viscoelastic properties, including one or more of the polymers mentioned above, as well as ethylvinyl acetate (EVA), polyphosphoric acid (PPA), and reactive elastomeric terpolymers. However, such conventional manufacturing of binder formulations can be complex and/or resource intensive.

The resource intensive and/or complex manufacturing processes required for certain conventional asphalt binders is evident in the conventional asphalt binders that utilize a chemically reactive and/or cross-linked polymer to enhance specific performance properties, e.g., elastic properties, of an asphalt binder. In one example, such a cross-liked polymer can be a cross-linked SBS, where the butadiene backbone is cross-linked via the addition of a vulcanization agent, e.g., sulfur. However, such a modified asphalt binder may require elevated paving temperatures and result in increased $H_2S$ emissions.

Other conventional modified asphalts can include the use of reactive elastomeric terpolymers. The reactive elastomeric terpolymers can include functional glycidyl functional groups in the polymer backbone, which may react with other polymer chains and/or asphaltene or resin constituents in the asphalt. However, such a modified asphalt can have an increased propensity to gel if the cross-linking or grafting reaction under certain conditions, resulting in a complex manufacturing process.

The modified asphalts and methods of producing the same disclosed herein can provide modified asphalts with improved performance properties that can be manufactured in a less complex manner. For instance, the modified asphalts described herein can be manufactured at ambient pressure and can be manufactured in several manners, such as bulk methods, high shear mixing, or low shear mixing. Further, in aspects, the asphalt can be modified by the addition of an olefin compound and an acid promoter, which can facilitate the chemical grafting of the olefin onto the asphalt. In such an aspect, after the chemical grafting is performed the acid promoter can stay in the modified asphalt, as there is no requirement to remove it from the modified asphalt product. Additionally, in certain aspects, the modified asphalt described herein can exhibit improved performance properties over prior asphalt-polymer products. For instance, in certain aspects, the modified asphalts described herein can exhibit improved multi-stress creep recovery and/or improved storage stability.

In this discussion, unless otherwise specified, a "T5 boiling point" refers to a temperature at which 5 wt. % of the feed, effluent, product, stream, or composition of interest will boil. One suitable method for measuring boiling points of crude oils or heavy feeds is ASTM test method D7169.

Modified Asphalt Compositions—Asphalt Component

In various aspects, the modified asphalt compositions disclosed herein can include an asphalt, one or more olefin compounds, and an acid promoter. In certain aspects, the asphalt is viscoelastic semi-solid bituminous material derived from the distillation residue of crude petroleum. In one or more aspects, the asphalt can be a product of atmospheric and/or vacuum distillation of crude petroleum.

In aspects, the asphalt can exhibit a T5 boiling point of about 400° C. or more, such as up to 550° C. or more, about 450° C. or more, such as up to 550° C. or more, or about 500° C. or more, such as up to 550° C. or more.

One way of characterizing an asphalt composition is by using SUPERPAVE™ criteria. SUPERPAVE™ criteria (as described in the 1996 edition of the American Association of State Highway and Transportation Officials (AASHTO) Provisional Standards Book and 2018 revised edition) can be used to define the Maximum and Minimum Pavement service temperature conditions under which the binder must perform. SUPERPAVE™ is a trademark of the Strategic Highway Research Program (SHRP) and is the term used for binder specifications as per AASHTO MP-1 standard. Maximum Pavement Temperature (or "application" or "service" temperature) is the temperature at which the asphalt binder will resist rutting (also called Rutting Temperature). Minimum Pavement Temperature is the temperature at which the binder will resist cracking. Low temperature properties of asphalt binders can be measured by Bending Beam Rheometer (BBR). According to SUPERPAVE™ criteria, the temperature at which a maximum creep stiffness (S) of 300 MPa at 60 s loading time is reached, is the Limiting Stiffness Temperature (LST). Minimum Pavement Temperature at which the binder will resist cracking (also called Cracking Temperature) is equal to LST-10° C.

The SUPERPAVE™ binder specifications for asphalt paving binder performance establishes the high temperature and low temperature stiffness properties of an asphalt. The nomenclature is PG XX-YY which stands for Performance Grade at high temperatures (HT), XX, and at low temperatures (LT), -YY degrees C., wherein -YY means a temperature of minus YY degrees C. Asphalt must resist high summer temperature deformation at temperatures of XX degrees C. and low winter temperature cracking at temperatures of -YY degrees C. An example popular grade in Canada is PG 58-28. Each grade of higher or lower temperature differs by 6° C. in both HT and LT. This was established because the stiffness of asphalt doubles about every 6° C. One can plot the performance of asphalt on a SUPERPAVE™ matrix grid. The vertical axis represents increasing high PG temperature stiffness and the horizontal axis represents decreasing low temperature stiffness towards the left, which can be seen in FIG. 1 and is discussed further below.

In some aspects, the asphalt used for producing the modified asphalts described herein can have a performance grade at high temperature of 58° C. or more, or 52° C. or more, or 46° C. or more, or 40° C. or more; or from about 40° C. to about 58° C., or from about 46° C. to about 58° C. In the same or alternative aspects, the asphalt used for producing the modified asphalts described herein can have a performance grade at low temperature of about -16° C. or less, about -22° C. or less, about -28° C. or less, or about -34° C. or less; or from about -34° C. to about -22° C., or from about -34° C. to about -16° C.

Modified Asphalt Compositions—Olefin Compound Component

In certain aspects, the modified asphalts described herein can include an asphalt modified by an additive or polymer, e.g., an olefin compound. In various aspects, the olefin compound can have a molecular weight of about 0.2 kDa or more, about 2.0 kDa or more, or about 50 kDa or more. In aspects, the olefin compound can have a molecular weight of about 200 kDa or less, about 150 kDa or less, or about 110 kDa or less. In various aspects, the olefin compound can have a molecular weight of about 0.2 kDa to about 110 kDa, about 2.0 kDa to about 110 kDa, or about 50 kDa to about 110 kDa.

In various aspects, the olefin compound can include any compound having at least one site of chemical unsaturation. In one aspect, the olefin compound can include a polymer comprising ethylene monomers, a polymer comprising propylene monomers, or a combination thereof. A wide variety of polymers comprising propylene monomers, ethylene monomers, ethylene-propylene co-polymers, or a combination thereof are known, and one such specific example that is useful in the modified asphalts described herein includes, but is not limited to, the VISTAMAXX™ performance polymers from ExxonMobil. In aspects, the olefin compound can include an ethylene propylene diene terpolymer. A wide variety of ethylene propylene diene terpolymers are known and example ethylene propylene diene terpolymers that are useful in the present modified asphalts include, but are not limited to, the VISTALON™ EPDM rubbers from ExxonMobil. In various aspects, the olefin compound can include one or more vinyl terminated polymers. In one aspect, the vinyl terminated polymer can include an atactic polypropylene having one or more vinyl/vinylidiene terminal double bonds. A wide variety of vinyl terminated polymers are available including, but not limited to, those described in U.S. Pat. Nos. 8,283,428, 8,093,336, 6,444,773, 8,372,930, 7,279,536, 6,117,962, 6,147,180, 8,283,428, and 9,255,168.

In certain aspects, the olefin compound can include linear or branched olefin compounds having about 12 carbon atoms or more, about 14 carbon atoms or more, about 16 carbon atoms or more, or about 20 carbon atoms or more. In aspects, the olefin compound can include linear or branched olefin compounds of any size, as long as such compounds have more than 4 carbon atoms. In aspects, small olefin compounds, e.g., olefin compounds having four carbon atoms or less, are too small to provide any improved properties to the modified asphalt.

In certain aspects, the olefin compound can be present in the modified asphalt in a concentration of about 0.5 wt. % or more, about 0.75 wt. % or more, or about 1.0 wt. % or more. In the same or alternative aspects, the olefin compound can be present in the modified asphalt in a concentration of about 7.0 wt. % or less, about 5.0 wt. % or less, or about 3.0 wt. % or less. In certain aspects, the olefin compound can be present in the modified asphalt in a concentration of about 0.5 wt. % to about 7.0 wt. %, about 0.75 wt. % to about 5.0 wt. %, or about 1.0 wt. % to about 3.0 wt. %.

Modified Asphalt Compositions—Acid Promoter

As noted above, the modified asphalts described herein can include an acid promoter. In aspects, the acid promoter can catalyze the chemical grafting of the olefin compound onto the asphalt. In aspects, the acid promoter can be a Lewis acid or a Bronsted acid. A non-limiting list of acid promoters that can be used to produce the modified asphalts described herein includes $AlCl_3$, $H_2SO_4$, polyphosphoric acid, $BCl_3$, $ZnCl_2$, $SnCl_4$, $TiCl_4$, solid acids, such as zeolites, and combinations thereof. In one aspect, the acid promoter can be any convenient Friedel-Crafts catalyst, such as $AlCl_3$, that in appropriate conditions can catalyze the alkylation of an aromatic component of the asphalt, for example. In certain aspects, the strength of the Lewis acid utilized can directly correlate to increased performance of the modified asphalt, e.g., improved performance grade at high and/or low temperatures, increased storage stability, or improved delayed elastic response. For instance, utilizing the acid promoter $AlCl_3$ (a stronger Lewis acid than $H_2SO_4$) in manufacturing a modified asphalt described herein may result in enhanced performance grade or storage stability compared to a modified asphalt that was made with the use of $H_2SO_4$.

In certain aspects, the acid promoter can be present in the modified asphalt in a concentration of about 0.1 wt. % or more, about 0.25 wt. % or more, or about 0.3 wt. % or more. In the same or alternative aspects, the acid promoter can be present in the modified asphalt in a concentration of about 0.9 wt. % or less, about 0.75 wt. % or less, or about 0.5 wt. % or less. In certain aspects, the acid promoter can be present in the modified asphalt in a concentration of about 0.1 wt. % to about 0.9 wt. %, about 0.25 wt. % to about 0.75 wt. %, or about 0.25 wt. % to about 0.5 wt. %.

Modified Asphalt Compositions—Properties

In various aspects, the modified asphalts described herein can exhibit one or more improved properties. For instance, in certain aspects, the modified asphalts described herein can exhibit a Penetration at 25° C. of about 30 decimillimeters (dmm) (1 dmm=0.1 mm) to about 110 dmm, or about 40 dmm to about 100 dmm, as determined according to test method EN 1426. In the same or alternative aspects, the modified asphalts described herein can exhibit a Penetration at 25° C., 100 g test for 5 s, of about 20 dmm to about 110 dmm, or about 30 dmm to about 100 dmm, as determined according to Chinese test method T0604.

In certain aspects, the modified asphalts described herein can exhibit a Softening Point of about 50° C. or more, about 55° C. or more, about 60° C. or more, or about 65° C. or more, as determined according to test method EN 1427. In the same or alternative aspects, the modified asphalts described herein can exhibit a R & B Softening Point of about 50° C. or more, about 55° C. or more, or about 60° C. or more, as determined according to Chinese test method T0606.

In one or more aspects, the modified asphalts described herein can exhibit a storage stability of about 0.8 to about 1.2, or about 0.9 to about 1.1 as determined according to ASTM test method D7173 and described further below in the Examples.

In various aspects, the modified asphalts described herein can exhibit an improved delayed elastic response. For instance, in certain aspects, the modified asphalts described herein may exhibit a non-recoverable creep compliance at 64° C., of about 1 $kPa^{-1}$ or less, or about 0.5 $kPa^{-1}$ or less, as determined according to the American Association of State Highway and Transportation Officials test method AASHTO M-332. In the same or alternative aspects, the modified asphalts described herein may exhibit an average Multi-Stress Creep Recovery at 3.2 kPa and 64° C. of about 35% or more, about 40% or more, about 50% or more, or about 60% or more, as determined according to the American Association of State Highway and Transportation Officials test method AASHTO M-332.

Modified Asphalt Compositions—Method of Manufacturing

As discussed above, the modified asphalt described herein, in aspects, can include the grafting of an olefin compound onto asphalt by the use of an acid promoter. In aspects, generally the asphalt is mixed with one or more olefin components and one or more acid promoters in the presence of heat to, in part, facilitate the chemical grafting of the olefin to the asphalt.

In various aspects, the specific blending technology can be chosen based on the nature of the additives, facilities available, and the desired performance properties. Further, in such aspects, the temperature and/or duration of mixing can be adjusted to achieve desired additive dispersion and enhanced property development. In certain aspects, the asphalt, olefin compound, acid promoter, or a combination thereof can be heated to any temperature above ambient temperature, e.g., 25° C., and that is below the temperature at which the asphalt, olefin compound, and/or acid promoter would thermally decompose. In certain aspects, the asphalt, olefin compound, acid promoter, or a combination thereof may be heated to a temperature of about 120° C. or more, about 140° C. of more, or about 150° C. or more. In the same or alternative aspects, the asphalt, olefin compound, acid promoter, or a combination thereof may be heated to a temperature of about 120° C. to about 250° C., about 120° C. to about 230° C., or about 140° C. to about 230° C.

In aspects, the modified asphalt can be made in a number of manners. For instance, one example method of manufacturing can include the preparation of a stock solution of asphalt, olefin compound, and acid promoter, which can be thereafter blended into a bulk amount of asphalt. In such an aspect, the olefin compound can be in liquid form prior to formation of the stock solution. Another example method can include the high shear blending of the asphalt and a solid olefin component, and after a period of time, adding the acid promoter. In yet another example method of manufacturing the modified asphalt can include low shear blending of asphalt and liquid polymer followed by the addition of an acid promoter. Specific examples of these methods are provided in the below Examples.

In certain aspects, the modified asphalt described herein can be further physically blended or compounded with other asphalt-modifying components, e.g., after the manufacture of the modified asphalts described above. In such an aspect, the modified asphalt can be compounded with one or more polymers, such as a polymer comprising ethylene monomers, a polymer comprising propylene monomers, ethylene-propylene co-polymer, ethylene-propylene diene terpolymer, vinyl terminated polymer, styrene-butadiene-styrene (SBS), or a combination thereof. In such an aspect, the modified asphalt can be compounded with additional asphalt-modifying components using any convenient compounding techniques.

EXAMPLES

Manufacturing Modified Asphalt with a Stock Solution

A stock solution was prepared in the following manner. A three neck round bottom flask containing a stir bar was charged with asphalt (40 g, of a commercially available asphalt having a SUPERPAVE™ rating of PG 64-22) and heated to 160° C. with mixing. Once the asphalt reaches 160° C. the olefin (40 mL, 1-hexadecene ("1HD") or a commercially available unhydrogenated metallocene C20-poly-α-olefin ("uPAO")) was charged into the flask, and the acid promoter (2 g, $AlCl_3$) was added slowly. After addition of the acid promoter, the mixture was heated to 190° C. for 15 minutes to disperse the promoter and subsequently cooled to 160° C. After 4 hours, the heat was removed and the stock solution was discharged into a receiver for storage and subsequent blending.

The blend was prepared in the following manner. 200 g, 16.7 wt. %, of the above stock solution was blended into a bulk amount of asphalt (1 kg, 83.3 wt. %) under low shear for 1 hour at 160° C. After 1 hour, the heat was removed and the volatiles were separated under vacuum distillation or solvent stripping conditions. The bottoms material was collected for storage and subsequent testing.

EXAMPLES

Manufacturing Modified Asphalt with High Shear Conditions 350 g of asphalt (commercially available asphalt having a SUPERPAVE™ rating of PG 64-22) was added into a container and heated to 190° C. with high shear mixing. Solid polymer (11 g) was slowly added at high shear and continue blending after addition for 1 hour. The polymer was either the uPAO mentioned above or a commercially available ethylene-propylene co-polymer (having 16 wt. % ethylene content, a flexural modulus, 1% secant, of about 14.4 Mpa measured according to ASTM test method D790, and a Tear Strength, die C, of about 33.3 kN/m measured according to ASTM test method D624 ("EPC"), or an atatic polypropylene having vinyl/vinylidene terminal double bonds and having a molecular weight of 2 kDa, 59 kDa, 75 kDa, or 123 kDa ("VTM")). The blend is removed from high shear and is continued blending at low shear for 20 hours at 160° C. After 20 hours, the acid promoter is added (0.9 g, $AlCl_3$). The blend was warmed to 190° C. for 15 minutes to disperse the promoter and subsequently cooled to 160° C. After 4 hours the heat was removed and the blend was stored for subsequent testing.

EXAMPLES

Manufacturing Modified Asphalt with Low Shear Conditions 350 g of asphalt (commercially available asphalt having a SUPERPAVE™ rating of PG 64-22) was added into a container and heated to 160° C. with low shear. Liquid polymer (11 g) was added slowly at low shear and continued to blend after addition for 1 hour, followed by addition of the acid promoter (0.9 g, $AlCl_3$). The blend was warmed to 190° C. for 15 minutes to disperse the acid promoter and subsequently cooled to 160° C. After 4 hours the heat was removed and the blend was stored for subsequent testing.

EXAMPLES

Modified Asphalts with Improved Performance Grade

FIG. 1 shows a SUPERPAVE™ matrix grid of modified asphalts that were made as described in any of the above manufacturing examples and tested for low temperature and high temperature grade performance according to the AASHTO MP-1 standard mentioned above. Particularly, the asphalt was modified with 1 wt. % or 2 wt. % 1HD and 0.5 wt. % acid promoter (either $AlCl_3$, $H_2SO_4$, or polyphosphoric acid ("PPA")). As can be seen in FIG. 1, an improvement in the low temperature quality was observed (improvement over the base quality line for unmodified asphalt) for the asphalt modified with 2 wt. % 1HD and 0.5 wt. % $AlCl_3$, and for the asphalt modified with 1 wt. % uPAO and 0.5 wt. % $AlCl_3$. These modifications, i.e., the chemical grafting of 1HD or uPAO to the asphalt in the present of $AlCl_3$ improved the performance grade of the asphalt from a PG 64-22 grade to a PG 64-28 grade.

Further, as can be seen in FIG. 1, of the three acid promoters that were evaluated ($AlCl_3$, $H_2SO_4$, and PPA), $AlCl_3$ was best at improving the low temperature performance grade, while $H_2SO_4$ had an effectiveness of improving the low temperature performance grade between that of $AlCl_3$ and PPA. This ranked order ability of the promoter to improve the low temperature asphalt properties ($AlCl_3$>$H_2SO_4$>PPA) correlates to the promoter's relative Lewis acidity. Improvements in performance grade quality were also observed with other asphalts.

EXAMPLES

Modified Asphalt with Improved Storage Stability

In this Example, the storage stability of various modified asphalts were tested. The storage stability was tested according to ASTM test method D7173. Generally the modified asphalts were placed in a container and exposed to 163° C. for 48 hours, and then thereafter the top and bottom portions of the samples were separately tested for any separation by performing dynamic shear rheometer (DSRo) measurements according to ASTM test method D7175. In this stability test, a DSRo Top/DSRo Bottom ratio between about 0.9 and about 1.1 can be considered the stable zone.

Figure 2:
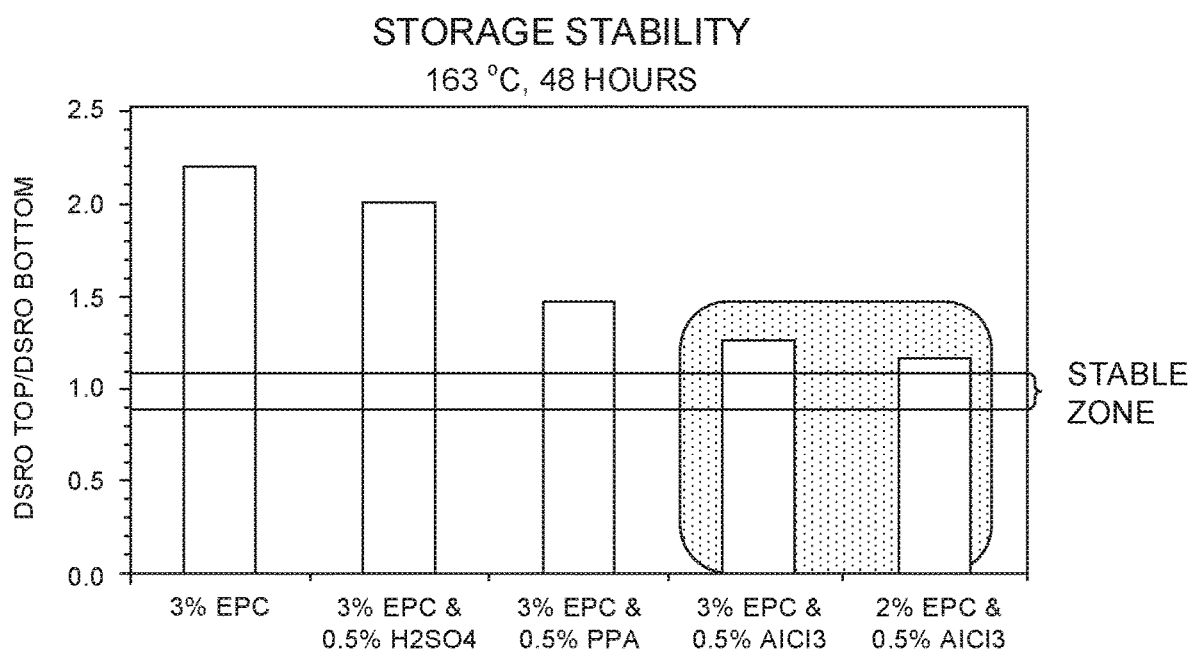
FIG. 2 depicts a bar graph of storage stability test results for various modified asphalts.

FIG. 2 depicts the storage stability test results for asphalts modified with 3 wt. % EPC alone, or modified asphalt with 3 wt. % EPC in the presence of 0.5 wt. % acid promoter (either $AlCl_3$, $H_2SO_4$, and PPA), and an asphalt modified with 2 wt. % EPC and 0.5 wt. % $AlCl_3$. Particularly, FIG. 2 depicts a bar graph showing the above-described asphalts modified with EPC, with the bar representing the DSRo Top/DSRo Bottom ratio. In particular, the asphalts that were modified with 2 wt. % or 3 wt. % EPC and 0.5 wt. % $AlCl_3$ showed improved storage stability compared to asphalt modified with 3 wt. % EPC with or without 0.5 wt. %, $H_2SO_4$, or PPA. Thus, this example shows that the EPC polymer itself does not impart storage stability to the asphalt. Further, this Example demonstrates the increased efficacy of the $AlCl_3$ promoter compared to the other promoters tested.

Figure 3:
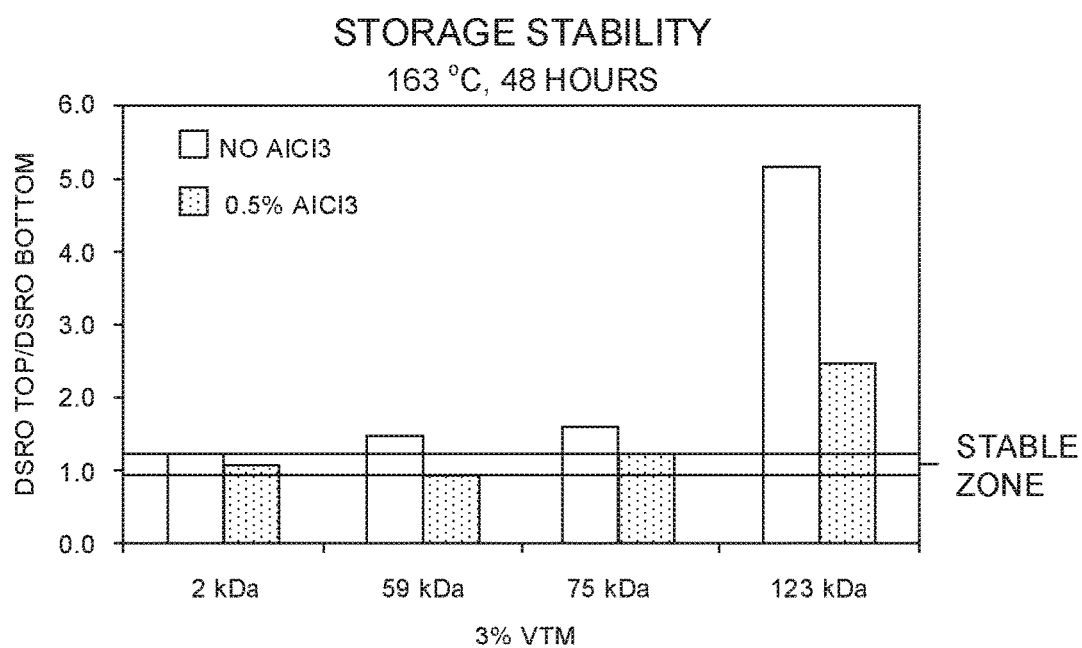
FIG. 3 depicts another bar graph of storage stability test results for various modified asphalts.

FIG. 3 depicts the storage stability test results for asphalts modified with 3 wt. % VTM of varying molecular weights (2 kDa, 59 kDa, 75 kDa, and 123 kDa) in the presence and absence of 0.5 wt. % $AlCl_3$. As can be seen in FIG. 3, the storage stability decreased with increasing molecular weight of the VTM. The storage stable modified asphalts were obtained with the 2 kDa, 59 kDa, and 75 kDa VTM-modified asphalts.

EXAMPLES

Modified Asphalt with Improved Multi-Stress Creep Recovery (MSCR) Properties

In this Example the Multi-Stress Creep Recovery (MSCR) of various modified asphalts were tested. The MSCR was tested according to the AASHTO M-332 test standard. The MSCR is a performance test for high performance asphalts that provides measures of delayed elastic response (Average % Recovery) and rutting resistance (Non-Recoverable Creep Compliance). These parameters are calculated based on the measured response of an asphalt sample to repeated stress (0.1 kPa or 3.2 kPa 1 sec) and recovery (9 sec) cycles under the test conditions.

Figure 4:
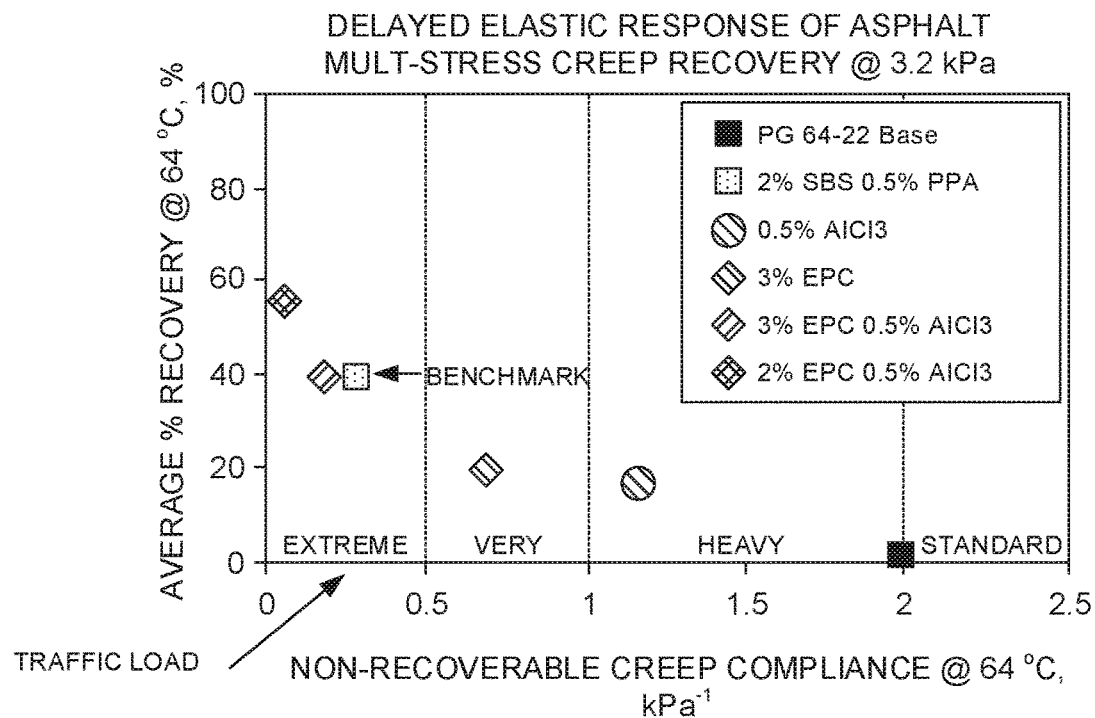
FIG. 4 depicts a graph of the multi-stress creep recovery test results for various modified asphalts.

FIG. 4 depicts the MSCR test results for asphalts modified with various amounts of EPC. FIG. 4 also depicts a benchmark asphalt blended with 2 wt. % SBS and 0.5 wt. % PPA. As can be seen in FIG. 4, the 2 wt. % and 3 wt. % EPC grafted blends matched or exceeded the MSCR properties of the SBS benchmark blend generated for this experiment. Particularly, FIG. 4 illustrates the improvement in delayed elastic response and rutting resistance for asphalts modified with EPC and $AlCl_3$.

Figure 5:
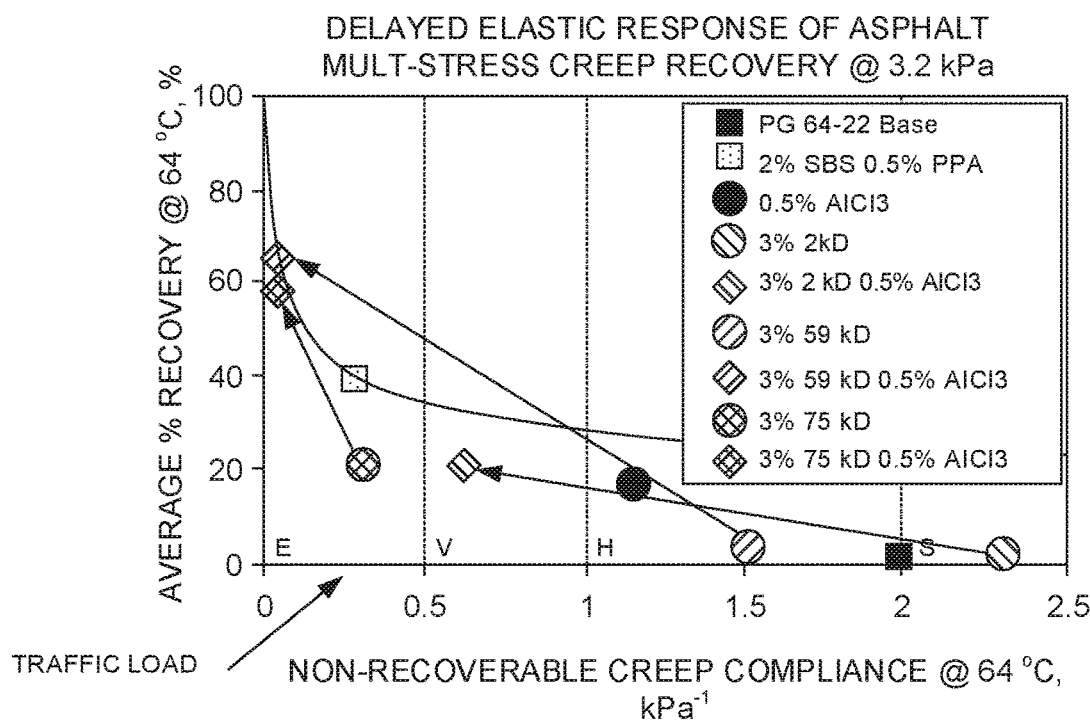
FIG. 5 depicts another graph of the multi-stress creep recovery test results for various modified asphalts.

FIG. 5 depicts the MSCR test results for asphalts modified with 3 wt. % VTM of varying molecular weights (2 kDa, 59 kDa, and 75 kDa). FIG. 5 also depicts a benchmark asphalt blended with 2 wt. % SBS and 0.5 wt. % PPA. FIG. 5 illustrates the improvement in delayed elastic response and rutting resistance for asphalts modified with VTM and $AlCl_3$. Further, as can be seen in FIG. 5, the asphalts modified with the 59 kDa or the 75 kDa VTM exceeded the MSCR properties of the SBS benchmark blend.

ADDITIONAL EMBODIMENTS

Embodiment 1

A method for modifying an asphalt, comprising: exposing an asphalt having a T5 boiling point of 400° C. or more to: 1) 0.2 wt. % to 5 wt. % of an olefin compound having a molecular weight of 0.2 kDa to 110 kDa; and 2) 0.1 wt. % to 2 wt. % of an acid promoter to form a modified asphalt.

Embodiment 2

The method of embodiment 1, wherein the exposing occurs at atmospheric pressure.

Embodiment 3

The method of embodiment 1 or 2, wherein the acid promoter comprises $AlCl_3$, $H_2SO_4$, polyphosphoric acid, $BCl_3$, $ZnCl_2$, $SnCl_4$, $TiCl_4$, zeolites, or a combination thereof.

Embodiment 4

The method of any of embodiments 1-3, wherein the olefin compound comprises a polymer comprising ethylene monomers, a polymer comprising propylene monomers, an ethylene-propylene co-polymer, an ethylene propylene diene terpolymer, one or more vinyl-terminated polymers, or a combination thereof.

Embodiment 5

The method of any of embodiments 1-4, wherein the asphalt comprises a high temperature performance grade of 58° C. or more and/or a low temperature performance grade of −34° C. to −22° C.

Embodiment 6

The method of any of embodiments 1-4, wherein the modified asphalt comprises a high temperature performance grade of 64° C. or more and/or a low temperature performance grade of −34° C. to −16° C.

Embodiment 7

The method of any of embodiments 1-6, wherein the exposing results in at least a portion of the olefin compound being covalently attached to at least a portion of the asphalt to form a grafted asphalt.

Embodiment 8

The method of any of embodiments 1-7, wherein the modified asphalt comprises a storage stability of about 0.8 to about 1.2 as determined according to the Storage Stability ASTM test method D7173, a Softening Point of about 50° C. or more, as determined according to test method EN 1427 a Penetration at 25° C. of about 30 dmm to about 110 dmm (or about 40 dmm to about 100 dmm), as determined according to test method EN 1426, or a combination thereof.

Embodiment 9

The method of any of embodiments 1-8, further comprising compounding the modified asphalt with a polymer comprising ethylene monomers, a polymer comprising propylene monomers, an ethylene-propylene co-polymer, an ethylene-propylene diene terpolymer, a vinyl terminated polymer, styrene-butadiene-styrene (SBS), or a combination thereof.

Embodiment 10

An asphalt composition comprising: an asphalt having an initial or T5 boiling point of 400° C. or more; 0.2 wt. % to 5 wt. % of an olefin compound having a molecular weight between 50 kDa and 110 kDa; and 0.1 wt. % to 2 wt. % of an acid promoter selected from $AlCl_3$, $H_2SO_4$, polyphosphoric acid, $BCl_3$, $ZnCl_2$, $SnCl_4$, $TiCl_4$, zeolites, or a combination thereof, wherein the asphalt composition is formed at a temperature of 160° C. to 230° C., the asphalt composition having a high temperature performance grade of 58° C. or more and a low temperature performance grade of −34° C. to −16° C.

Embodiment 11

The asphalt composition of embodiment 10, wherein the asphalt composition has a high temperature performance grade of 64° C. or more and a low temperature performance grade of −34° C. to −22° C.

Embodiment 12

The asphalt composition of embodiments 10 or 11, wherein the acid promoter comprises $AlCl_3$.

Embodiment 13

The asphalt composition of any of embodiments 10-12, wherein the olefin compound comprises a polymer comprising ethylene monomers, a polymer comprising propylene monomers, an ethylene-propylene co-polymer, an ethylene-propylene diene terpolymer, one or more vinyl-terminated polymers, styrene-butadiene-styrene (SBS), or a combination thereof.

Embodiment 14

The asphalt composition of any of embodiments 10-13, wherein the asphalt composition comprises a storage stability of about 0.8 to about 1.2 as determined according to the Storage Stability ASTM test method D7173, a Softening Point of about 50° C. or more, as determined according to test method EN 1427, a Penetration at 25° C. of about 3 mm to about 11 mm, as determined according to test method EN 1426, or a combination thereof.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for modifying an asphalt, comprising:
exposing an asphalt having a T5 boiling point of 400° C. or more to: 1) 0.2 wt. % to 5 wt. % of an olefin compound having a molecular weight of 0.2 kDa to 110 kDa; and 2) 0.1 wt. % to 2 wt. % of an acid promoter to form a modified asphalt.

2. The method of claim 1, wherein the exposing occurs at atmospheric pressure.

3. The method of claim 1, wherein the acid promoter comprises $AlCl_3$, $H_2SO_4$, polyphosphoric acid, $BCl_3$, $ZnCl_2$, $SnCl_4$, $TiCl_4$, zeolites, or a combination thereof.

4. The method of claim 1, wherein the acid promoter comprises $AlCl_3$.

5. The method of claim 1, wherein the olefin compound comprises a polymer comprising ethylene monomers, a polymer comprising propylene monomers, or a combination thereof.

6. The method of claim 1, wherein the olefin compound comprises an ethylene-propylene co-polymer, an ethylene propylene diene terpolymer, or combination thereof.

7. The method of claim 1, wherein the olefin compound comprises one or more vinyl-terminated polymers.

8. The method of claim 1, wherein the asphalt comprises a high temperature performance grade of 58° C. or more.

9. The method of claim 1, wherein the asphalt comprises a low temperature performance grade of −34° C. to −22° C.

10. The method of claim 1, wherein the exposing results in at least a portion of the olefin compound being covalently attached to at least a portion of the asphalt to form a grafted asphalt.

11. The method of claim 1, wherein the modified asphalt comprises a storage stability of about 0.8 to about 1.2 as determined according to the Storage Stability ASTM test method D7173.

12. The method of claim 1, wherein the modified asphalt comprises a Softening Point of about 50° C. or more, as determined according to test method EN 1427.

13. The method of claim 1, wherein the modified asphalt comprises a Penetration at 25° C. of about 30 dmm to about 110 dmm, as determined according to test method EN 1426.

14. The method of claim 1, further comprising compounding the modified asphalt with a polymer comprising ethylene monomers, a polymer comprising propylene monomers, an ethylene-propylene co-polymer, an ethylene-propylene diene terpolymer, a vinyl terminated polymer, styrene-butadiene-styrene (SBS), or a combination thereof.

15. An asphalt composition comprising:
an asphalt having an initial or T5 boiling point of 400° C. or more;
0.2 wt. % to 5 wt. % of an olefin compound having a molecular weight between 50 kDa and 110 kDa; and
0.1 wt. % to 2 wt. % of an acid promoter selected from $AlCl_3$, $H_2SO_4$, polyphosphoric acid, $BCl_3$, $ZnCl_2$, $SnCl_4$, $TiCl_4$, zeolites, or a combination thereof,
wherein the asphalt composition is formed at a temperature of 160° C. to 230° C., the asphalt composition having a high temperature performance grade of 58° C. or more and a low temperature performance grade of −34° C. to −16° C.

16. The asphalt composition of claim 15, wherein the asphalt composition has a high temperature performance grade of 64° C. or more and a low temperature performance grade of −34° C. to −22° C.

17. The asphalt composition of claim 15, wherein the acid promoter comprises $AlCl_3$.

18. The asphalt composition of claim 15, wherein the olefin compound comprises a polymer comprising ethylene monomers, a polymer comprising propylene monomers, or a combination thereof.

19. The asphalt composition of claim 15, wherein the olefin compound comprises an ethylene-propylene co-polymer, an ethylene-propylene diene terpolymer, or combination thereof.

20. The asphalt composition of claim 15, wherein the olefin compound comprises one or more vinyl-terminated polymers.

21. The asphalt composition of claim 15, wherein the asphalt composition comprises a storage stability of about 0.8 to about 1.2 as determined according to the Storage Stability ASTM test method D7173.

22. The asphalt composition of claim 15, wherein the asphalt composition comprises a Softening Point of about 50° C. or more, as determined according to test method EN 1427.

23. The asphalt composition of claim 15, wherein the asphalt composition comprises a Penetration at 25° C. of about 30 dmm to about 110 dmm, as determined according to test method EN 1426.

* * * * *